United States Patent [19]
Long

[11] 3,789,845
[45] Feb. 5, 1974

[54] CAPSULE AND TABLET ADMINISTRATION FOR ANIMALS

[76] Inventor: J. Raymond Long, R.D. No. 3, Cuba, N.Y. 14727

[22] Filed: Jan. 29, 1973

[21] Appl. No.: 327,425

[52] U.S. Cl............................ 128/264, 128/127
[51] Int. Cl........................ A61f 5/46, A61m 31/00
[58] Field of Search... 128/127, 128, 264, 260, 261, 128/263

[56] References Cited
UNITED STATES PATENTS

| | | | |
|---|---|---|---|
| 71,692 | 12/1867 | Brigham | 128/127 |
| 1,354,014 | 9/1920 | Baxter | 128/264 |
| 1,936,437 | 11/1933 | Peters | 128/264 |
| 2,616,424 | 11/1952 | Brown et al. | 128/264 |

Primary Examiner—Aldrich F. Medbery
Attorney, Agent, or Firm—George W. Shaw et al.

[57] ABSTRACT

A syringe holder tube is used to administer capsules or tablets to animals. A capsule is pressed into the opening at the rounded end of the tube and turned to seat in the opening with most of the capsule extending outward from the tube. Then the animal's mouth is opened and the tube is quickly thrust over base of tongue and into the throat where the capsule or tablet is dislodged when contacting the soft palate and is automatically swallowed by the animal. For tablets, a syringe piston is removably inserted in the tube opening to serve as a plug, and a sticky food material is used to stick the tablet to the plug. Then the tube is thrust into the animal's mouth in the same way to knock the tablet off where it will be swallowed automatically.

17 Claims, 2 Drawing Figures

PATENTED FEB 5 1974   3,789,845

CAPSULE AND TABLET ADMINISTRATION FOR ANIMALS

THE INVENTIVE IMPROVEMENT

Administering capsules and tablets to animals has long been a problem, and many guns and other devices have been attempted. These tend to have moving parts and require insertion of a device and then some operation to expel the capsule or tablet where the animal will swallow it. Such devices are complex, expensive, and not very satisfactory.

The invention involves recognition of a way that a simple tube can be used for administering capsules and tablets to animals in a way that does not require operation of any mechanism and is more satisfactory than previous methods. The invention aims at simplicity, economy, reliability and safety in a capsule and tablet administrator that is easily used in a fast and efficient way without hurting the animal.

SUMMARY OF THE INVENTION

The inventive method of administering gelatin capsules to animals involves a plastic tube with a rounded end having a through opening substantially smaller than the maximum diameter of the capsule and smaller than the inside of the diameter of the tube. Then the end of the capsule is pressed into the opening so substantially more than half the capsule remains outside the opening, the animal's mouth is opened, and the tube is quickly thrust over the base of the animal's tongue and into the animal's throat with the soft palate and dislodge the capsule from the tube in a position where it is automatically swallowed by the animal. Tablet administration is accomplished with a similar tube having a blunt end by using a sticky material to stick the tablet lightly to the blunt end so it will be knocked off easily in the animal's throat.

DRAWINGS

FIG. 1 is a partially cross-sectional view of a preferred embodiment of the invention for administering a capsule; and FIG. 2 is a partially cross-sectional view of a preferred embodiment of the invention for administering a tablet.

DETAILED DESCRIPTION

The invention occurred with the discovery that a syringe holder tube as presently manufactured could be used very successfully as a capsule administrator for small animals. Syringes are sterilized and pre-packaged in holder tubes that are normally thrown away after the syringe is used. Such holder tubes are mass produced in large quantities from plastic material and have hitherto had no use other than packaging a syringe. Holder tube 10 of the drawings is a common syringe holder tube shown in axial cross-section, and although holder tubes vary somewhat for different sized syringes, holder tube 10 has the preferred shape for practicing the invention.

The enlarged end 11 of holder tube 10 is used as a handle, and the other end 12 is rounded as illustrated. A through opening 13 extends through rounded end 12 on the axis of tube 10 as illustrated, and opening 13 has a diameter a little less than the inside diameter of the tube 10.

Figure 1:
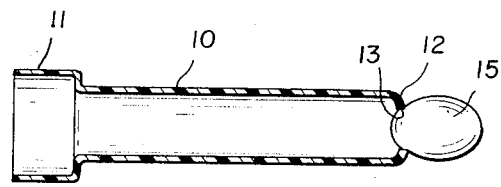

FIG. 1 shows a capsule 15 supported in opening 13 in tube 10 for administration to an animal. As shown, only a relatively small amount of capsule 15 is pressed into opening 13, and capsule 15 has a maximum diameter substantially larger than the diameter of opening 13. Capsule 15 is a common, gelatin capsule having approximately the illustrated shape and popular for animal medicine. It is preferably chilled substantially below room temperature before being inserted in opening 13 and this can be done by leaving capsule 15 in a refrigerator for a while before loading into holder 10.

It appears improbable that capsule 15 can stay in opening 13 when holder 10 is held with end 12 pointing downward. However, in practice capsule 15 stays securely in opening 15 with holder 10 at any orientation. When seating capsule 15 in opening 13, capsule 15 is preferably turned on its axis a bit to work its gelatin skin into a secure engagement with the edge of opening 13.

Then the animal's mouth is opened in the usual way, and capsule 15 is administered merely by quickly inserting tube 10 in a generally axial thrust over the base of the animal's tongue and into the animal's throat where capsule 15 contacts the soft palate and is dislodged from opening 13. Tube 10 is then quickly withdrawn from the mouth to leave capsule 15 where it is automatically swallowed by the animal. The withdrawal movement quickly follows the insertion motion and the whole process preferably takes less than a second. There is no operation to be performed other than the quick motion of tube 10, and no moving parts have to be synchronized with the thrusting of capsule 15 into the animal's throat. Capsule 15 can be dislodged from opening 13 either by contact with the animal's soft palate on the inward stroke or on the outward stroke, because either way, capsule 15 is deposited far enough into the animal's throat to be swallowed automatically with no chance of being spit out. The whole process is then quick, efficient, and safe, especially because the smooth plastic outer surface of tube 10 with its rounded end 12 is not dangerous to the animal.

Figure 2:
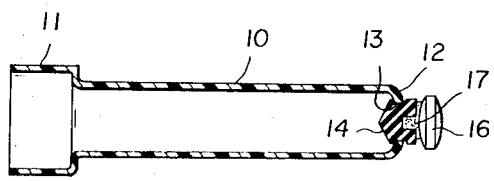

FIG. 2 shows use of tube 10 to administer tablet 16. Opening 13 is filled with a plug 14 which is preferably the piston from a syringe. Plug 14 is made of an elastomeric material and intended for moving snugly through the barrel of a syringe to serve as a piston. It can be pulled off from a used syringe, and snapped into opening 13 to form plug 14 as illustrated.

A sticky material 17 is spread over the end of plug 14 to stick tablet 16 to plug 14 as illustrated. Many materials are satisfactory for sticking tablet 16 to plug 14, and the preferred materials are those that are often found in a house or in a household refrigerator, such as: butter, oleomargarine, lard, fat, salad dressing, mayonnaise, peanut butter, jam, jelly, honey and petroleum jelly. Material 17 is preferably a food product that is not toxic or disagreeable to the animal, and although material 17 is not an adhesive in the normal sense it is sticky enough to stick tablet 16 lightly to plug 14. Only enough adhesion is used to ensure that tablet 16 does not fall off of plug 14 when tube 10 has its end 12 pointed downward, and it is desirable that tablet 16 otherwise dislodge easily from plug 14.

Then tube 10 carrying tablet 16 is thrust quickly into the animal's throat and quickly withdrawn as previously described so that tablet 16 contacts the animal's soft palate and is dislodged from plug 14 in a place where the animal will automatically swallow it.

Tube 10 as an actual syringe holder tube is about the right size for capsules and tablets such as worm pills and the like, that are administered to cats, dogs, and other animals about the size of cats and dogs. However, tube 10 could be specially made in larger or smaller sizes for administering tablets and capsules to much smaller animals such as hampsters or gerbals. Many different shapes of tablets and pills can be stuck to the end of holder 10, and instead of a separate plug 14, holder 10 can be made with a closed, blunt end to which tablets can be stuck. Many different handles or gripping ends 11 can be used if desired, but one of the advantages of the invention is in using a readily available syringe holder tube for administering capsules and tablets without modification of the tube.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the size and shaping of the inventive administrator for administering various size capsules and tablets to various sized animals.

I claim:

1. A method of administering a gelatin capsule to an animal, said method comprising:
   a. selecting a plastic tube with a rounded end having a through opening substantially smaller than the maximum diameter of said capsule, and smaller than the inside diameter of said tube;
   b. pressing an end of said capsule into said opening so substantially more than half of said capsule remains outside said opening;
   c. opening the animal's mouth;
   d. quickly inserting said tube in a generally axial thrust over the base of said animal's tongue and into said animal's throat to poke said capsule into contact with said animal's soft palate and dislodge said capsule from said opening; and
   e. quickly withdrawing said tube from said mouth to leave said capsule where it is automatically swallowed by said animal.

2. The method of claim 1 including turning said capsule as said capsule is pressed into said opening to help seat capsule in said opening.

3. The method of claim 1 including chilling said capsule substantially below room temperature before pressing said capsule into said opening.

4. The method of claim 1 including using a syringe holder tube as said plastic tube.

5. The method of claim 4 including turning said capsule as said capsule is pressed into said opening to help seat said capsule in said opening.

6. The method of claim 5 including chilling said capsule substantially below room temperature before pressing said capsule into said opening.

7. A method of administering a tablet to an animal, said method comprising:
   a. selecting a plastic tube with a blunt end;
   b. using a sticky material to stick said tablet lightly to said blunt end;
   c. opening the animal's mouth;
   d. quickly inserting said tube in a generally axial thrust over the base of said animal's tongue and into said animal's throat to poke said capsule into contact with said animal's soft palate and dislodge said capsule from said opening; and
   e. quickly withdrawing said tube from said mouth to leave said tablet where it is automatically swallowed by said animal.

8. The method of claim 7 including using food material as said sticky material.

9. The method of claim 7 including using a syringe holder tube with a hole in the end as said plastic tube, and inserting a syringe piston in the hole in said syringe holder tube to form said blunt end.

10. The method of claim 9 including using food material as said sticky material.

11. A gelatin capsule administrator for animals, said administrator comprising:
    a. a plastic tube having a rounded end;
    b. a through opening in said rounded end;
    c. said opening having a diameter less than the inside diameter of said tube;
    d. a capsule seated in said opening with substantially more than one-half of said capsule remaining outside said opening; and
    e. the maximum diameter of said capsule being substantially larger than said diameter of said opening.

12. The administrator of claim 11 wherein said tube is a syringe holder tube.

13. A tablet administrator for animals, said administrator comprising:
    a. a plastic tube having a rounded end;
    b. a through opening in said rounded end;
    c. said opening having a diameter less than the inside diameter of said tube;
    d. a plug removably inserted in said opening; and
    e. a sticky material releasably sticking said tablet to said plug.

14. The administrator of claim 13 wherein said sticky material is a food product.

15. The administrator of claim 13 wherein said tube is a syringe holder tube.

16. The administrator of claim 15 wherein said plug is a syringe piston.

17. The administrator of claim 16 wherein said sticky material is a food product.

* * * * *